(12) United States Patent
Pfeiffer et al.

(10) Patent No.: US 6,177,967 B1
(45) Date of Patent: Jan. 23, 2001

(54) VOLTAGE TUNING OF LCD POLARIZATION STATE BY VARYING DRIVE VOLTAGE TO COMPENSATE FOR OPTICAL MISALIGNMENT

(75) Inventors: Matthias Thomas Peter Pfeiffer, Mesa; Dan J. Schott; Joseph Hourigan Morrissy, both of Phoenix, all of AZ (US)

(73) Assignee: Three-Five Systems, Inc, Tempe, AZ (US)

( * ) Notice: Under 35 U.S.C. 154(b), the term of this patent shall be extended for 0 days.

(21) Appl. No.: 09/162,180

(22) Filed: Sep. 28, 1998

(51) Int. Cl.[7] .............................. G02F 1/133; G09G 3/36
(52) U.S. Cl. .................................. 349/33; 345/89
(58) Field of Search ....................... 349/5, 9, 33; 345/89

(56) References Cited

U.S. PATENT DOCUMENTS

| 5,239,322 | * | 8/1993 | Takanashi et al. | 349/9 |
| 5,959,773 | * | 9/1999 | Gagnon | 349/5 |

* cited by examiner

Primary Examiner—Walter Malinowski
(74) Attorney, Agent, or Firm—John D. Titus

(57) ABSTRACT

A method of modifying the polarization state of light exiting a Liquid Crystal Display that is effected without altering the optical image of the display comprises reducing the select voltage to the LCD cell to less than the saturation select voltage. In one embodiment of an apparatus incorporating features of the present invention, a color LCD display is constructed using two or more LCD cells that are aligned to produce an optimum image through the display optics. One or more of the LCD cells are then driven to the dark state at a select voltage that is less than the saturation select voltage for that cell. By operating the LCD cell at less than the saturation select voltage, the polarization state of the light exiting a dark selected pixel compensates for the misalignment between the saturation voltage polarization axis of the display and the system polarization axis of the optics. Accordingly, the selected pixel appears darker than would the same pixel driven at the saturation voltage. By operating the LCD cell at less than the saturation select voltage, higher contrast ratios and improved color saturation is achieved without sacrificing image quality.

15 Claims, 2 Drawing Sheets

VOLTAGE TUNING OF LCD POLARIZATION STATE BY VARYING DRIVE VOLTAGE TO COMPENSATE FOR OPTICAL MISALIGNMENT

BACKGROUND OF THE INVENTION

Liquid Crystal display projector apparatus are growing in popularity for use with computerized presentations, television and other home entertainment purposes, and the like. Therefore, many types of projection apparatus using light valves have been proposed; among these apparatus, a liquid crystal projection apparatus has recently been commercialized that displays images on a large screen by enlarging and projecting images displayed by miniaturized liquid crystal display (LCD) panels.

In projection displays, an image from an active device, such as an LCD, is projected onto a screen at a desired magnification. For color images, complementary images in three primary colors may be obtained from three light valves. The images from the light values are simultaneously projected and superimposed onto a screen, or displayed as a virtual image for direct viewing by the user. The optics used to generate color images in this manner typically comprise a dichroic beam splitter such as a color separation/combining prism set, and a polarizing beam splitter such as a polarizing beam splitting cube. The optical performance of the dichroic beam splitter must be very high quality for high resolution imaging. The crossed dichroic cube variety of beam splitter typically consists of four subcomponents assembled together in one cubic unit. Two of the three optical paths in this cube involve imaging the light valves through a split mirror without introducing aberrations. To produce an acceptable image, the optical and mechanical tolerances required for assembly of the four subcomponents must be held very precisely.

The color prism variety of beam splitter typically consists of three prisms assembled into a single compact unit. As with the dichroic cube, two of the three optical paths in the color prism involve imaging the light valve through a dichroic split mirror without introducing aberrations. The optical and mechanical tolerances for assembly of the three components (including in some cases a precisely controlled air gap) must similarly be very tightly controlled.

In any of the foregoing displays in which complementary images are superimposed on one another, a significant limitation on the contrast ratio of the display is the inability to precisely align both the optical images and the polarization axes of the multiple LCD panels. In order to ensure adequate fidelity of the projected color image, the image produced by each of the three light valves must be precisely aligned with the image produced by the other two of the light valves. Accordingly, in addition to maintaining tight tolerances on the dichroic beam splitter assembly, the translational and rotational position of the light valves themselves with respect to the dichroic beam splitter must be tightly controlled. In many cases, optical feedback from the light valves themselves are used during final assembly to ensure proper alignment. Liquid Crystal Display light valves, however, also experience manufacturing tolerances that cause the polarization state (i.e., the dominant polarization axis and the ellipticity) of light exiting the LCD to vary relative to its image. Although the aforementioned optical feedback alignment of the LCD images compensates for deviations from the ideal optical alignment, the process does not compensate for deviations from the ideal polarization state. The imperfect polarization states among the multiple LCD's in such a display permits substantial light leakage of pixels selected to be in their dark state, which leads to an overall reduction in the contrast ratio achievable by such a display and introduces undesirable color shifts. Rotating the LCD light valves to compensate for the polarization state of the light exiting the LCDs would improve contrast ratio, but would also produce an unacceptable misalignment of the LCD images.

What is needed then is a method for compensating for the polarization state of an LCD that is independent from the mechanical/optical alignment of the LCD.

SUMMARY OF THE INVENTION

The present invention comprises a method of compensating for a less than ideal polarization state of a Liquid Crystal Display that improves contrast ratio without altering the optical image produced by the LCD. In one embodiment incorporating features of the present invention, a color LCD display comprises a plurality of LCD cells that are aligned to produce an optimum image through the display optics. In the event one or more of the LCD cells do not produce the ideal polarization state, the appropriate LCD cells are driven to the dark state at a select voltage that is less than the saturation select voltage for that cell. By operating the LCD cell at less than the saturation select voltage, the polarization state of the light exiting a selected pixel is altered relative to the polarization state of a saturation voltage selected pixel in such a way that the non-saturation selected pixel appears darker than would a pixel driven at the saturation voltage. By operating the LCD cell at less than the saturation select voltage, higher contrast ratios can be achieved without sacrificing image quality.

BRIEF DESCRIPTION OF THE DRAWINGS

The invention will be better understood from a reading of the following detailed description taken in conjunction with the drawing figures in which like reference designators are used to designate like elements, and in which.

DETAILED DESCRIPTION

Figure 1:
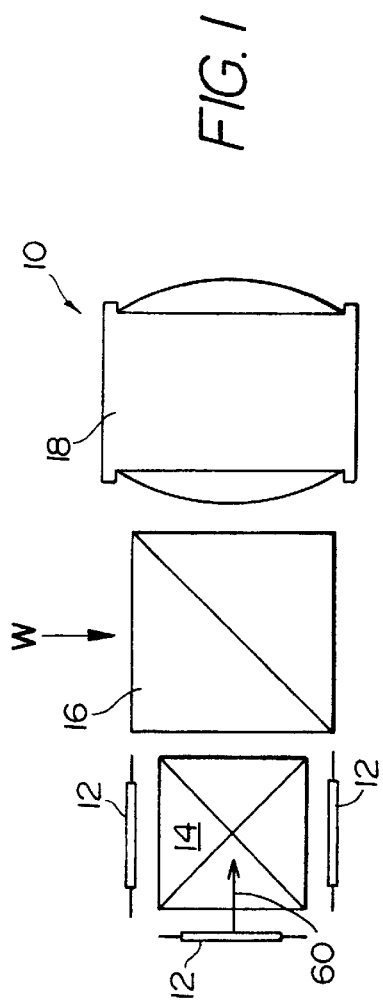
FIG. 1 is a simplified schematic of a three-light valve projection display system.

Referring to the drawings in detail, FIG. 1 is a simplified schematic of a typical three-light valve projection display system 10. The projection display system 10 includes three liquid crystal reflective light valves 12 positioned on three surfaces of a crossed dichroic beam splitter cube 14, a polarizing beam splitter cube 16, and a projection lens 18. White illumination source W introduces light into one face of the polarizing beam splitter cube 16 which reflects one polarized component thereof into crossed dichroic beam splitter cube 14. Dichroic beam splitter cube 14 then separates the polarized white light into red, green and blue components. Each color component is incident upon a liquid crystal reflective light valve 12 which selectively rotates the polarization of the light to produce the required image. The three reflected selectively polarized images are then recombined in the dichroic beam splitter cube 14 and selectively transmitted through the polarizing beam splitter cube 16 to the projection lens 18 as described more fully hereinafter.

In the operation of a typical birefringent reflective liquid crystal light valve, an n/4 lambda retarding liquid crystal is used (where n is an odd number and lambda is the dominant wavelength of the light incident to the LCD). As illustrated in FIG. 1, for example, white light is reflected by the polarizing beam splitter cube 16 as S-polarized light through the dichroic beam splitting cube 14 to illuminate the reflective liquid crystal light valves 12. Each pixel of each light valve is selectively driven by a voltage to selectively rotate the polarization of the reflected light. Where the light impinges a pixel in the non-selected state, the polarized light is retarded by n/4 times the wavelength of the light to become circularly polarized light. When the circularly polarized light ray is reflected from the specular reflector of the light valve, the sense and direction of the polarization reverses and on passing through the n/4 retarding layer an additional n/4 wavelength phase shift is added for a total phase shift of n/2. The total change in phase of the light upon entering and exiting the retarding layer is an odd-multiple of ½ wavelength, which transforms the initially S-polarized light into P-polarized light. Light having P-polarization is transmitted through the polarizing beam splitter cube to the projection optics.

Where the S-polarized incident light impinges a pixel in the selected state, the bulk of the liquid crystal is homeotropic and, therefore non-birefringent. If the rubbing directions of the front and back alignment layers are complementary to the polarization of the incident light, (e.g. +/−22.5 degrees) the effects of the alignment and surface liquid crystal layers are mutually compensating. Accordingly, the S-polarized light is reflected by the LCD back as S-polarized light. Light having S-polarization is reflected by the polarizing beam splitter cube back toward the source and is not passed through to the projection lens. Thus, the non-selected pixels having P-polarization appear light and the selected pixels having S-polarization appear dark in the projected image.

As is well known in the art, for a given incident light polarization, the dominant polarization axis of light exiting an LCD is determined by the orientation of the liquid crystal alignment layers, the thickness of the fluid layer, the twist of the fluid, the birefringence of the fluid and other physical characteristics that are well known and can be accurately predicted. Tolerances on these dimensions and properties, however, cause the actual polarization axis to vary from the nominal polarization axis, typically up to ±2 degrees. In a single display system, the output polarizer (analyzer) can be rotated to accommodate variations in the dominant polarization axis where optimum matching is dictated. However, where two or more LCD's are combined in an optical system having a single polarization axis, for example an optical system incorporating a polarizing beam splitting cube, the polarization axis of the system cannot be adjusted to accommodate variations in a single LCD. This is because a change in the system polarization axis that benefited one LCD in the system would, in many instances, worsen the polarization axis misalignment with the remaining LCD's in the system.

If an LCD cell driven at the appropriate saturation voltage is viewed through an optical system having a system polarization axis that is misaligned with respect to the LCD cell's saturation polarization axis, the dark selected pixels will appear brighter than if the same cell is viewed through an analyzer that is properly aligned with the LCD cell's saturation polarization axis. As used herein, the "system polarization axis" refers to the polarization axis of the light impinging the LCD from the optical system. The "polarization axis" of an LCD panel as used herein means the angular orientation of the LCD panel (taken relative to the nominal LCD panel vertical axis) at which a selected pixel appears darkest when viewed through an optical system having a given system polarization. The "saturation polarization axis" as used herein means the polarization axis of a selected pixel driven at the saturation voltage.

It has been determined by the inventors of the present invention that, if the LCD cell referred-to above is driven at less than the saturation-select voltage while viewed through the same optical system having a misaligned system polarization axis, under the appropriate conditions, the pixels driven at less than the saturation voltage appear darker than the pixels driven at the saturation select voltage. Without limiting the invention as described to a particular theory of operation, it is believed by the inventors of the present invention that driving the LCD at less than the saturation select voltage causes the polarization axis of the light to be under-rotated by the LCD cell, which results in the light exiting the cell having a polarization axis that is rotated slightly with respect to the nominal LCD saturation polarization axis. It is equally plausible, however, that driving the LCD panel at less than the saturation select voltage simply results in a reduction in the ellipticity of the light exiting the cell, which would also lead to less light leakage in the dark-selected pixel.

Figure 2:
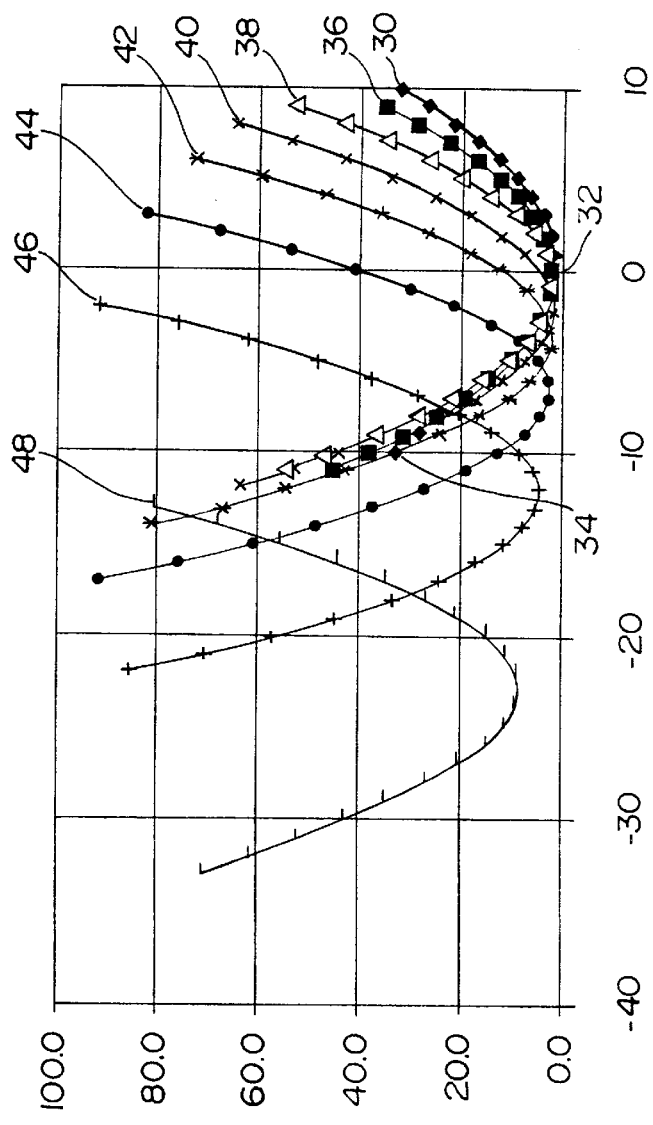
FIG. 2 is a graphical representation of polarization angle versus select voltage demonstrating features of the present invention.

FIG. 2 is a graphical representation of the darkness of a dark-selected pixel driven at various select voltages versus the angle between the polarization axis of an analyzer and the LCD cell image vertical axis, for a 45 degree left twist ¼ lambda retardation self-compensating active matrix display, which was incorporated into the optical system of FIG. 1. The particular model used in the example was an SVGA resolution cell having a 4 $\mu$m gap.

A polarizing beam splitter was oriented so that the polarization axis of the light incident to the display was aligned with the vertical axis of the display. The front and back alignment layers of the LCD were oriented with their rubbing directions at +/−22.5 degrees with respect to the vertical axis of the display. Light measurements were taken with a Display Measurements System Model 703 from Autronic combined with a Nikon Optiphot 2 polarizing microscope. As shown in FIG. 2 the liquid crystal display was initially driven at a select voltage equal to the 7 volt RMS square wave saturation voltage. The display was then rotated relative to the beam splitting cube until the minimum brightness was achieved, indicating that the polarization axis of the display was aligned with the polarization axis of the polarizing beam splitting cube. This position was arbitrarily designated as zero degrees relative angle (designated by reference numeral 32 in FIG. 2) and the relative brightness arbitrarily set to 1. The liquid crystal display was then rotated relative to the beam splitting cube and brightness measurements taken. These measurements at saturation voltage were plotted as shown by the line indicated by reference numeral 30. In FIG. 2, relative angle is plotted along the horizontal X-axis in degrees, and relative brightness (a dimensionless ratio, based on the darkest pixel being assigned a darkness of 1) plotted along the vertical Y-axis. The positive and negative sense of the angle plotted in FIG. 2 is defined as right handed rotation about a ray 60 (FIG. 1) having an origin at the reflective back surface of the liquid crystal display passing through the liquid toward the beam splitting cube.

As shown in FIG. 2, rotating the liquid crystal display relative to the polarization axis of polarizing beam splitting cube in either direction from the zero degree position 32 causes the light leakage of the dark pixel to increase. For example, at the saturation voltage, a 10 degree misalignment between the display and the system polarization axis, designated by reference numeral 34, results in a dark pixel approximately 35 times as bright as when the polarization axes are aligned properly.

The liquid crystal display was returned to the zero angle position 32. The select voltage to the liquid crystal display was then reduced in 0.5 volt intervals and the plot of display angle versus relative brightness repeated. Data were plotted in FIG. 2 at 6 volts (reference 36), 5.5 volts (reference 38), 5 volts (reference (40), 4.5 volts (reference 42), 4 volts (reference 44), 3.5 volts (reference 46), and 3 volts (reference 48).

As shown by the data plotted in FIG. 2, as the select voltage is reduced from the saturation voltage, the angular orientation of the display relative to the system polarization axis at which the selected pixels appear darkest (hereinafter "compensation angle") gradually rotates in a negative direction.

Figure 3:
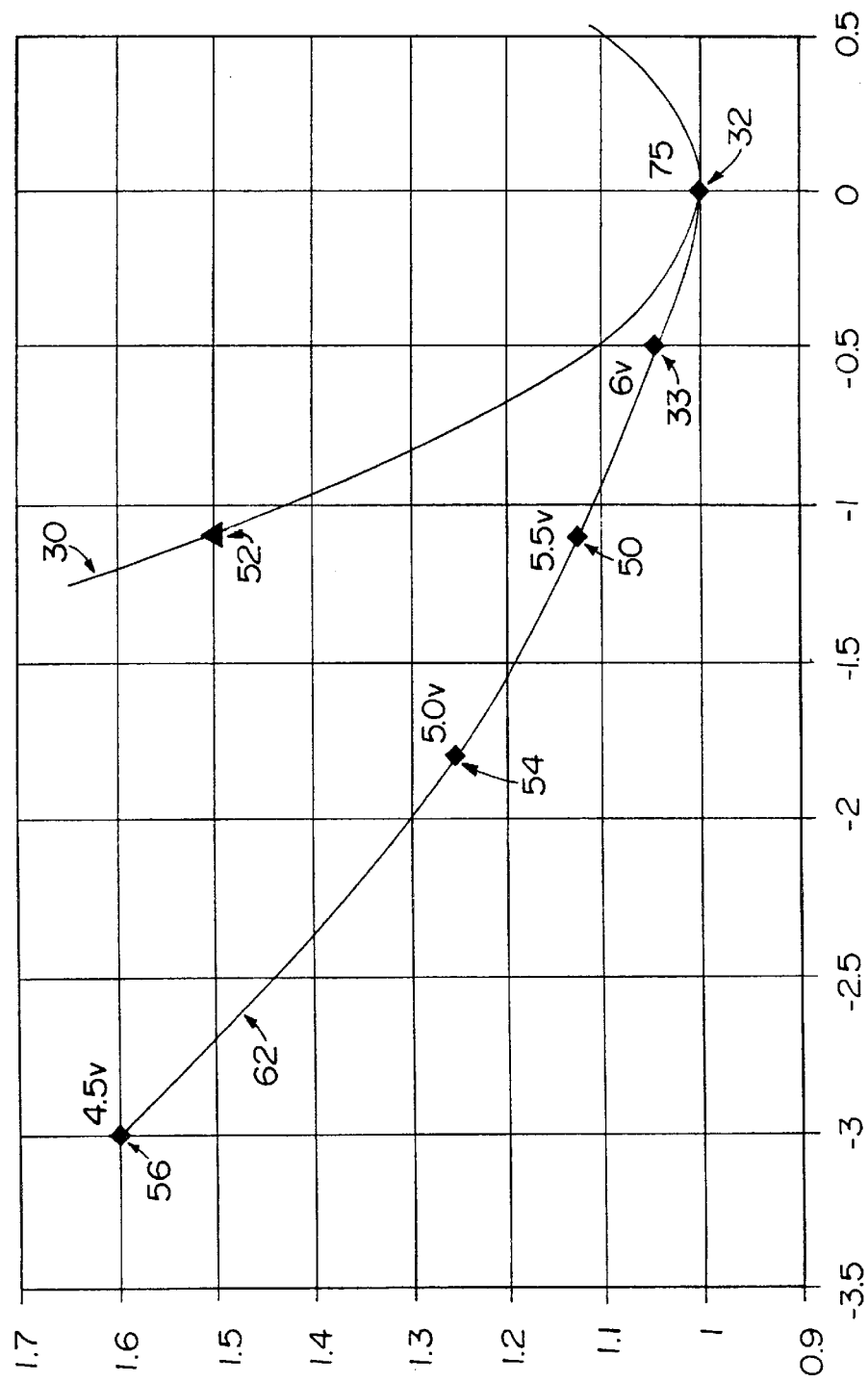
FIG. 3 is a plot of minimum brightness and polarization angle at various select voltages.

FIG. 3 is a plot (reference 62) of the local minimum brightness of the curves plotted in FIG. 3 showing the angle and relative brightness corresponding to the darkest state of the curves for 7 volts (reference 32), 6 volts (reference 33), 5.5 volts (reference 50), 5 volts (reference 54) and 4.5 volts (reference 56). A portion of the saturation voltage curve (reference 30) is plotted for reference. As shown by comparison of reference 33 to reference 32, reducing the select voltage from 7 volts to 6 volts alters the compensation angle by −0.5°. Simultaneously, as would be expected, the minimum brightness of a selected pixel (reference 33) is approximately 1.05 times as bright as the minimum brightness of a pixel driven at the saturation voltage (reference 32). As the voltage is further reduced to 5.5 volts the minimum brightness of the selected pixel (reference 50) approximately 1.12 times brighter than a pixel driven at the saturation voltage and the minimum brightness occurs at an angle of approximately −1.1°. At a voltage of 5.0 volts, the minimum brightness of the selected pixel (reference 54) is approximately 1.27 times as bright as the saturation voltage selected pixel (32) and the minimum brightness occurs at an angle of approximately −1.8°. At a voltage of 4.5 volts, the minimum brightness of the selected pixel (reference 56) is approximately 1.6 times as bright as the saturation voltage selected pixel (32) and the minimum brightness occurs at an angle of approximately −3.0°. As can be seen from the plot of FIG. 3, although the minimum brightness of a non-saturation voltage selected pixel is brighter than the saturation voltage selected pixel, when viewed through optics having a polarization axis that is not aligned with the saturation polarization axis of the display, the non-saturation voltage selected pixel will appear darker. For example, although the minimum brightness of a selected pixel driven at 5.5 volts (reference 50) is approximately 1.12 times as bright as the saturation voltage selected pixel (reference 32), when viewed through optics that are misaligned by −1.1 degree, the pixel driven at saturation voltage will appear approximately 1.33 times as bright (1.5/1.12) as the pixel driven at 5.5 volts. Accordingly, where the polarization axis of the system is misaligned by −1.1 degree, the non-saturation voltage selected pixel will appear substantially darker than the saturation voltage selected pixel.

In an optical system such as that shown in FIG. 1, where three liquid crystal displays must be oriented so that their images correspond exactly but there is a single system polarization axis, the present invention permits each liquid crystal display to be positioned mechanically for optimum correlation of the display images. The polarization state of the displays are then adjusted to produce the minimum light leakage by controlling the select voltage as described above. By "voltage-tuning" the polarization state of the displays as described above, the darkness of the dark-selected pixels is maximized, thereby increasing the total contrast ratio achievable by the display system and improving color saturating as well.

It was determined by the inventors of the present invention that increasing the select voltage beyond the saturation voltage did not induce a corresponding positive compensation for a system polarization axis rotated in the positive direction, however, an opposite direction of compensation can be achieved by using opposite twist (i.e. right hand twist) liquid crystal cells. Other classes of liquid crystal displays, may exhibit a bi-directional shift if driven by a voltage over the nominal saturation voltage. Accordingly, any voltage-induced change of the polarization state of a liquid crystal display induced to compensate for system polarization axis alignment is considered within the scope of the present invention. Moreover, although the illustrative embodiment comprises a reflective projection display, the principles of the present invention are equally applicable to transmissive projection displays.

Where a liquid crystal display exhibits only a unidirectional compensation for system polarization axis misalignment, as in the illustrative example, system assembly can be biased toward the display with the greatest inherent negative saturation polarization axis by mounting that display with its saturation polarization axis aligned to the system polarization axis. The remaining two displays can then be mounted for optimum image alignment and the voltage-tuned to minimize light leakage relative to the system polarization axis. Manufacturing techniques can also be adjusted to bias the saturation polarization axis of the liquid crystal displays themselves in the positive angular direction relative to the display vertical axis. By biasing the tolerances slightly in the positive direction, it can be ensured that if correction is required, the correction will always be in the negative angular direction.

It should be noted that the principles of the foregoing invention are applicable irrespective of whether the image is projected onto a screen, as discussed with respect to the illustrative embodiment, or whether the image is viewed by the user looking into the optics. Accordingly, as used herein the term "viewing optics" refers to optics suitable for projecting an image as well as optics suitable for viewing directly or as virtual images.

Although the invention has been described in terms of the illustrative embodiment, it will be appreciated by those skilled in the art that various changes and modifications may be made to the illustrative embodiment without departing from the spirit or scope of the invention. It is intended that the scope of the invention not be limited in any way to the illustrative embodiment shown and described but that the invention be limited only by the claims appended hereto.

What is claimed is:

1. A liquid crystal display system comprising:
   a first liquid crystal display panel having a saturation select voltage and a first saturation polarization axis;
   a light source optically coupled to said first liquid crystal display panel for providing a source of illumination thereto;
   viewing optics optically coupled to said first liquid crystal display panel for receiving an image from said liquid crystal display panel, said viewing optics having a system polarization axis, said system polarization axis being displaced rotationally from said first saturation polarization axis;
   an electronic controller adapted to drive said first liquid crystal display at a voltage less than said saturation select voltage, such that a dark-selected pixel of said first liquid crystal display panel appears darker when viewed through said viewing optics than would the same pixel driven at said saturation select voltage.

2. The liquid crystal display system of claim 1, further comprising:
   a second liquid crystal display panel having a second saturation select voltage and a second saturation polarization axis;
   said viewing optics optically coupled to said second liquid crystal display panels, for receiving a combined image from said first and second liquid crystal display panels; and said electronic controller being capable of selectively driving said second liquid crystal display at a voltage less than said second saturation select voltage such that a dark-selected pixel of said second liquid crystal display panel appears darker when viewed through said viewing optics than would the same pixel driven at said saturation select voltage.

3. A liquid crystal display system comprising:

first and second liquid crystal display panels;

an electronic controller for selectively delivering a driving voltage to said first and second liquid crystal display panels;

a source of polarized light comprising first and second color components;

a color splitting prism for receiving said polarized light, directing said first color component in a first direction to impinge said first liquid crystal display and directing said second color component in a second direction to impinge said second liquid crystal display;

viewing optics optically coupled to said first and second liquid crystal display panels;

said first liquid crystal display panel being mounted relative to said color splitting prism to define a first image projected through said viewing optics, said first liquid crystal display having a first saturation voltage and a first saturation polarization axis;

said second liquid crystal display panel being mounted relative to said color splitting prism to define a second image projected through said viewing optics, said second liquid crystal display having a second saturation voltage and a second saturation polarization axis, said mounting of said first and second liquid crystal display panels being such that said first and second images are superimposed on each other;

said electronic controller driving said first liquid crystal display at a voltage different from said first saturation voltage second liquid crystal display such that a dark-selected pixel of said first liquid crystal display appear darker when viewed through said viewing optics than said dark-selected pixel driven at said saturation voltage.

4. The liquid crystal display system of claim 3, wherein:

said viewing optics comprise means for projecting an image onto a screen.

5. The liquid crystal display system of claim 3, wherein:

said viewing optics comprise means for direct viewing of an image by an observer.

6. The liquid crystal display system of claim 3, wherein:

said first and second liquid crystal display panels comprise Twisted Nematic liquid crystal displays.

7. The liquid crystal display system of claim 3, wherein:

said first and second liquid crystal display panels comprise reflective liquid crystal displays.

8. The liquid crystal display system of claim 3, wherein:

said first and second liquid crystal display panels comprise transmissive liquid crystal displays.

9. The liquid crystal display system of claim 3, further including:

a third liquid crystal display said polarized light further comprising a third color component;

said color splitting prism further directing said third color component in a third direction to impinge said third liquid crystal display, said third liquid crystal display panel being mounted relative to said color splitting prism to define a third image projected through said viewing optics, said third liquid crystal display having a third saturation polarization axis, said mounting of said third liquid crystal display panel being such that said first, second, and third images are superimposed on each other;

said electronic controller being adapted to drive said third liquid crystal display at a voltage different from said first liquid crystal display such that a dark-selected pixel of said third liquid crystal display appears darker when viewed through said veiwing optics than said dark-selected pixel when driven at said saturation voltage.

10. In a liquid crystal display video system comprising a plurality of liquid crystal display panels, an electronic controller for selectively delivering a driving voltage to said plurality of liquid crystal display panels, a light source having a polarized light output, and viewing optics, the improvement comprising:

a first liquid crystal display panel mounted relative to said light source to define a first image for projection through said viewing optics, said first liquid crystal display having a first saturation polarization axis;

a second liquid crystal display panels mounted relative to said light source to define a second image for projection through said viewing optics, said second liquid crystal display having a second saturation polarization axis, said mounting of said first and second liquid crystal display panels being such that said first and second images are superimposed on each other;

a dark-selected pixel of said first liquid crystal display being adjusted to compensate for misalignment relative to said second saturation polarization axis of said second liquid crystal display by adjusting said driving voltage from said controller to said first liquid crystal display.

11. The liquid crystal display system of claim 10, wherein:

said first liquid crystal display panel is driven at a voltage less than said second liquid crystal display.

12. The liquid crystal display system of claim 11, wherein:

said second liquid crystal display panel is driven at a saturation voltage.

13. The liquid crystal display system of claim 10, wherein:

said first and second liquid crystal display panels comprise Twisted Nematic liquid crystal displays.

14. The liquid crystal display system of claim 10, wherein:

said first and second liquid crystal display panels comprise reflective liquid crystal displays.

15. The liquid crystal display system of claim 10, wherein:

said first and second liquid crystal display panels comprise transmissive liquid crystal displays.

* * * * *